United States Patent
Mätzler (10) Patent No.: US 10,844,892 B2
(45) Date of Patent: Nov. 24, 2020

(54) FASTENING DEVICE

(71) Applicant: Grass GmbH, Höchst (AT)

(72) Inventor: Dominik Mätzler, Andelsbuch (AT)

(73) Assignee: Grass GmbH, Höchst (AT)

( * ) Notice: Subject to any disclaimer, the term of this patent is extended or adjusted under 35 U.S.C. 154(b) by 479 days.

(21) Appl. No.: 15/388,835

(22) Filed: Dec. 22, 2016

(65) Prior Publication Data

US 2017/0175789 A1      Jun. 22, 2017

(30) Foreign Application Priority Data

Dec. 22, 2015 (DE) ................ 20 2015 008 847 U (51) Int. Cl.
*F16B 12/24* (2006.01)
*F16B 13/06* (2006.01)
*F16B 12/10* (2006.01)

(52) U.S. Cl.
CPC .............. *F16B 13/06* (2013.01); *F16B 12/24* (2013.01); *A47B 2230/0033* (2013.01); *F16B 2012/103* (2013.01)

(58) Field of Classification Search
CPC .... F16B 2012/103; F16B 13/06; F16B 12/24; A47B 2230/0033
See application file for complete search history.

(56) References Cited

U.S. PATENT DOCUMENTS

| | | | |
|---|---|---|---|
| 1,285,245 A | 11/1918 | Lacerda et al. | |
| 3,527,486 A * | 9/1970 | Gamp | F16B 12/24 403/11 |
| 4,301,706 A * | 11/1981 | Clinch | F16B 12/46 403/217 |
| 5,690,405 A | 11/1997 | Huber | |
| 5,810,505 A | 9/1998 | Henriott et al. | |
| 9,939,001 B2 * | 4/2018 | Deman | F16B 12/2027 |
| 2019/0195258 A1 * | 6/2019 | Zimmer | F16B 12/24 |

FOREIGN PATENT DOCUMENTS

| | | |
|---|---|---|
| AT | 348183 B | 2/1979 |
| AT | 352333 B | 9/1979 |
| DE | 7636140 U | 6/1977 |
| DE | 29507322 U1 | 7/1995 |

(Continued)

OTHER PUBLICATIONS

Translation of WO 2012062618. Khodabandeh, Amer. Connection Element Having an Integrated Snap Connection. May 18, 2012.*

(Continued)

*Primary Examiner* — Josh Skroupa
(74) *Attorney, Agent, or Firm* — Edell, Shapiro & Finnan, LLC (57) ABSTRACT

A fastening device comprises a dowel and a connecting element. The dowel has a sleeve-like or pot-like shape that is mountable in a blind hole or in a passage opening of a first furniture part. The dowel includes a receiving space defined by a wall comprising at least two walls sections. The connecting element is fixed on the dowel to fasten the first furniture part to a second furniture part, wherein the dowel is fixable in the blind hole or passage opening via the connecting element spreading apart the at least two wall sections radially outwards against an inner surface of the blind hole or passage opening.

6 Claims, 7 Drawing Sheets

(56) References Cited

FOREIGN PATENT DOCUMENTS

| DE | 29518690 U1 | 2/1996 |
| DE | 29722265 U1 | 3/1998 |
| DE | 29908769 U1 | 9/1999 |
| DE | 19830740 A1 | 1/2000 |
| DE | 202004000199 U1 | 4/2004 |
| DE | 10319413 A1 | 11/2004 |
| DE | 202008001095 U1 | 6/2008 |
| DE | 102010051372 A1 | 5/2012 |
| DE | 102013106409 A1 | 12/2014 |
| WO | 2012150490 A2 | 11/2012 |

OTHER PUBLICATIONS

Search Report in corresponding Chinese Patent Application No. 201611199084.1, dated Jul. 30, 2018, with English translation.
Search Report in corresponding European Patent Application No. 16200897.3, dated Aug. 21, 2017, with English translation.

* cited by examiner

FASTENING DEVICE

CROSS REFERENCE TO RELATED APPLICATIONS

This application claims foreign priority under 35 U.S.C. § 119(a)-(d) to German Application No. 202015008847.3 filed on Dec. 22, 2015, the entire contents of which are hereby incorporated by reference.

FIELD OF THE INVENTION

The invention relates to a fastening device comprising a dowel and a connecting element, fixed on the dowel, for fastening a first furniture part to a second furniture part, wherein the dowel can be mounted in a blind hole or in a passage opening of the one furniture part and can be fixed via the connecting element.

BACKGROUND

There are many ways to connect two components, in particular, parts of furniture to each other in such a manner that they can be detached. For this purpose connections via an expansion dowel are known in timberwork and/or furniture construction. In this case the expansion dowel is inserted with a connecting element into an existing borehole in the first component; and the other component has the counterpiece, which may consist, for example, of an eccentric component. The eccentric component can be used to connect via the connecting element the two components to each other with as little play as possible.

Such fastening devices comprising a dowel and a connecting element have a plethora of uses in the furniture industry, for example, for furniture connectors, but also when fastening mounting plates, for hinges or the like. The Austrian patents AT 348 183 B and AT 352 333 B disclose fastening devices, in which an expansion dowel is inserted into a blind hole of a furniture side wall so that a mounting plate can be fastened to said side wall. The German patent DE 198 30 740 A1 discloses a railing fastener for drawers, wherein an expansion dowel is rotated into a fastener borehole of a front panel, wherein a head component, which overlaps the dowel in the axial direction, can be anchored in said dowel. For anchoring purposes, the head component has an expansion head, which is pushed like a hook into the dowel and which spreads apart when the dowel is swiveled.

The German patent DE 295 07 322 U1 also shows a fastener comprising an anchoring device, which is anchored in the front panel of drawers. Furthermore, there is an adjustment component, which is fastened to a railing pipe. The adjustment component can be inserted into the anchoring device, so that in this case it is possible to adjust the length of the railing via the adjustment component.

The German patent DE 295 18 690 U1 discloses a fastening device, wherein an expansion dowel is also disposed in the front panel of a drawer, wherein the expansion dowel can be anchored by a suitable expansion component. By inserting the expansion component and by tilting the entire system, the expansion component is moved axially in the expansion dowel, so that the dowel spreads apart and is securely anchored in the front panel.

The U.S. Pat. No. 5,690,405 A discloses a connecting system for connecting a railing to a rear wall of a drawer, wherein the end of the railing is connected to the fastening component. A corresponding fastening component in the rear wall of the drawer has an open slot, in which the fastening component can be hung. Furthermore, the fastening component has a catch hook, which latches behind an edge of the rear wall-sided component and, in so doing, secures the connection.

SUMMARY

The object of the present invention is to connect as easily as possible two furniture parts, in particular, two side walls to each other via a fastening device.

The present invention achieves, according to a first variant, this engineering object via a fastening device of the type that is described in the introductory part in that the dowel is formed in a sleeve-like or pot-like manner and optionally has a pot bottom and a dowel wall, which surrounds a receiving space and which is formed by at least two wall sections, which can be spread apart radially outwards by the connecting element.

Following insertion of the connecting element into the receiving space of the dowel, the connecting element is moved into its end position, as a result of which the dowel is spread apart at least in sections. In so doing, the dowel wall engages in the receiving wall of the blind hole or the passage opening. Since the connecting element is fixed by the attached furniture part, the dowel stays fixed in its spread apart form.

In a further development of the invention the dowel wall is slotted at least in sections in the longitudinal direction. This arrangement gives the dowel a certain degree of elasticity, so that, on the one hand, the connecting element can be moved in the dowel; and, on the other hand, the deformed wall of the dowel can dig into the peripheral wall of the blind hole or passage opening and can anchor the dowel.

The receiving space is advantageously contracted in the direction of the pot edge. This contraction ensures that the end of the connecting element that is located in the dowel cannot be dislodged from the dowel and slip unintentionally out of the receiving space. This contraction allows the axial tensile forces of the connecting element to be transferred to the dowel and vice versa.

An especially preferred embodiment of the invention provides that the receiving space is slotted or unslotted in the region of the pot edge. An unslotted pot edge can support relatively high forces against expansion and, in addition, ensures that the visible edge of the blind hole or the passage opening will not be damaged, if the connecting element exerts a tensile force on the dowel. That is, the edge will not tear off.

An optimal anchoring of the dowel in the blind hole or the passage opening is provided by the feature that the wall sections of the dowel can be deformed, can be moved or can be tilted at least in sections in the direction of the inner wall of the blind hole. In this case the wall sections can be made in one piece or multiple pieces. After the deformation, displacement or tilting, the wall sections rest with sawtooth-like regions against the wall.

A positive-locking connection of the connecting element and the dowel is achieved by the fact that the connecting element has a thickening on its end located in the receiving space. The thickening of the end located in the receiving space has a dimension that is greater than the pot edge, so that the end cannot pass by said pot edge, but rather is held back by said pot edge.

Thus, in a further development of the invention the thickening is formed as an ellipsoid or ovoid transversely to the longitudinal axis of the dowel and can be tilted by the connecting element in the receiving space and can be expanded radially inside the receiving space and directly at the pot edge. Owing to this expansion the dowel thickens and becomes wedged in the receiving opening of the furniture part; and the free end of the connecting element is held back by the pot edge.

In an additional embodiment the thickening is designed partially spherical and has an expansion nose, which is adjacent to the pot bottom and over which the thickening can be displaced axially in the receiving space, when the expansion nose is swiveled by the connecting element. The expansion nose is used to move the thickening axially in the dowel, as soon as said dowel has reached its end position. At the same time the free end of the connecting element, which is located in the dowel, lines up and plunges over the expansion nose at the dowel bottom or the pot bottom. At this point the thickening is pressed against the pot edge, which, however, holds it back in the receiving space. The dowel wall is expanded radially in the region of the pot bottom and penetrates into the wall of the blind hole or the passage opening and engages therein.

In a further development the inner wall of the receiving space is designed so as to be partially spherical, wherein the thickening rests against the inner wall. Therefore, the receiving space constitutes a type of ball cup and is expanded by the thickening when subjected to a load. For this purpose the ball cup is configured so as to be slotted in the longitudinal direction of the connecting element.

An alternative embodiment of the invention provides that an assembly tool, for example, for generating a tensile force, can be applied to the connecting element. For this purpose the connecting element has a collar, a contraction, a breakthrough or the like, to which the assembly tool can be applied at times and by which forces can be transmitted to the connecting element.

A positive-locking connection of the dowel and the blind hole or the passage opening takes place in accordance with the invention in that the pot wall has at least one sawtooth-like, in particular, circumferential tooth on its radial outer face. This tooth is disposed in such a way that it points in the pull-out direction of the connecting element and bites into the wall of the blind hole or the passage opening, when the connecting element is subjected to a tensile force.

The engineering object described in the introductory part is achieved, according to a second variant of the invention, by a fastening device comprising a dowel and a connecting element, fixed on the dowel, for fastening a first furniture part to a second furniture part, in that the dowel can be mounted in a blind hole or in a passage opening of the one furniture part and can be fixed by the connecting element, that the dowel is provided with an external thread, and that the dowel can be rotated via the connecting element into its end position in the blind hole or in the passage opening.

The blind hole or the passage opening can be designed without a thread or with an internal thread. The external thread of the dowel is designed advantageously so as to be self-tapping, so that the dowel can also be screwed into non-threaded receiving openings. The torque, which is introduced into the connecting element, is transmitted by said connecting element to the dowel, so that said dowel can be screwed into the receiving opening.

Depending on the desired requirement, the dowel may be designed to be hollow or solid. A hollow dowel offers the advantage that it has a negligible weight, whereas solid dowels can transfer large forces.

In a further development of the invention it is provided that a lug is provided on the connecting element. This lug is used to introduce the torque into the connecting element. In this case the lug is designed in such a way that it can be grasped by hand or by machine, i.e., that the fastening device can also be mounted without a tool.

An advantageous embodiment of the invention provides that the lug is provided on the free end of the connecting element that lies opposite the dowel. The lug is in axial alignment on the connecting element so that the axis of rotation, on the one hand, and the longitudinal axes of the connecting element as well as the dowel, on the other hand, are coaxial.

The torques can be easily transferred by the lug to the connecting element and from said connecting element to the dowel. Since the radial dimension of the lug can be freely selected as required, even relatively large torques can be introduced by hand.

In order to be able to remove the lug quickly and easily after the dowel has been mounted in the receiving opening, a torque-limiting predetermined breaking point is provided between the lug and the connecting element. The predetermined breaking point limits the torque that can be transferred to a specifiable value, which is reached when the dowel has reached its end position in the receiving opening, for example, at the bottom of the blind hole. Then the lug breaks off of the connecting element.

The engineering object described in the introductory part is achieved, according to a third variant of the invention, by a fastening device comprising a dowel and a connecting element, fixed on the dowel, for fastening a first furniture part to a second furniture part, in that the dowel can be mounted in a blind hole or in a passage opening of the one furniture part and can be fixed by the connecting element, wherein the dowel is provided with an external thread, and the dowel has tool engagement faces, into which a tool can be inserted; and said tool can be used to rotate the dowel into its end position in the blind hole or in the passage opening.

Therefore, the dowel in this variant is not rotated into the receiving opening by the connecting element, but rather by a tool that is to be applied separately to the dowel. To this end the dowel has at least one axial and/or radial tool engagement face, to which the tool is applied. The tool itself may be designed in many ways, so that even a hooked wrench and the like can be used.

The tool engagement faces can be formed preferably by at least one groove, in particular, by two grooves, which are at an angle, in particular at a right angle, to each other. The corresponding tool is inserted into the groove or grooves, so that the necessary torque can be transferred to the dowel. As soon as the dowel has reached its end position, the tool can be removed from the groove.

In a particularly preferred embodiment of the invention the groove or grooves is/are formed so as to be open radially inwards. As a result, it is possible to apply, for example, a hooked wrench, a screwdriver, a Phillips screwdriver or the like quickly and easily to the dowel without being prevented by the connecting element from applying and then rotating the tool.

In a further development of the invention it is provided that the groove or grooves is/are open radially inwards and/or axially in the direction of the connecting element. The external thread of the dowel is not damaged by the groove and can be completely rotated into the receiving opening, even when the tool is inserted.

The end of the connecting element that is located in the dowel is designed spherical in accordance with the invention, where in this case the dowel has a ball cup, in order to receive and hold the end. A ball cup is used as the bearing for the partially spherical end of the connecting element, so that said connecting element can be tilted about the center of the bearing and can be swiveled, in particular, away from the grooves, in order to create space, so that a tool can be inserted into the groove or grooves. After removal of the tool, the connecting element is swiveled or tilted back again into the desired end position.

In order to prevent the free end of the connecting element from being pulled out of the ball cup, the ball cup tapers off in the direction of the connecting element. The ball cup has only one passage opening for the shaft of the connecting element, so that said connecting element can extend through the dowel.

In order to be able to tilt or swivel, as described above, the connecting element, and to be able to create space in the region of the groove or grooves in order to apply a tool, the dowel has a ball cup, to which is connected a truncated cone, which opens and in which the connecting element can be moved away from the groove or the grooves. The groove or grooves extends/extend in the shell of this truncated cone. Instead of the grooves, it is also conceivable to have one or more axially extending boreholes, protrusions, notches and/or the like, which can also be provided on the end face of the dowel.

The engineering object described in the introductory part is achieved, according to a fourth variant of the invention, by a fastening device comprising a dowel and a connecting element, fixed on the dowel, for fastening a first furniture part to a second furniture part, in that the dowel can be mounted in a blind hole or in a passage opening of the one furniture part and can be fixed by the connecting element, wherein the dowel is composed of at least two parts, wherein one of the dowel elements has a nose, which can be inserted when the dowel is inserted into the blind hole or the passage opening, and a tooth, which can be pushed out at the same time.

The use of two dowel elements has the advantage that the one dowel element can be used to fix the other dowel element in the receiving opening. When the dowel is inserted into the receiving opening, the one dowel element is not effective yet. Only after or just before reaching the end position of the dowel, does the one dowel element unfold its effectiveness by fixing the other dowel element.

In one preferred embodiment of the invention it is provided that the two dowel elements are connected to each other in an articulated manner. In this case they occupy a smaller diameter in the one tilted position than in the other tilted position, so that the two dowel elements can be moved via the connecting element from the one into the other tilted position.

A further development provides in accordance with the invention that the one dowel element is coupled to the other dowel element, exhibiting the connecting element, in an articulated manner. The one dowel element can form a section of a bearing or a bearing shell for a section of the other dowel element. The two dowel elements can be pivoted with each other about this bearing, so that in the one pivot position they can be inserted into the receiving opening; and in the other pivot position they can be fixed in the receiving opening. The two dowel elements are moved from the one into the other pivot position via the connecting element.

One embodiment of the invention provides that the one dowel element has a nose, which moves a tooth out radially when the dowel is inserted axially into the receiving opening, as soon as the dowel has reached its end position. In this context the nose is used as a control element for pushing the tooth out.

According to the invention, the nose is provided on the dowel element that faces away from the connecting element. The nose works in the manner of a feeler and detects the insertion depth of the dowel in the receiving opening. As soon as the dowel has reached the bottom of the opening, this event is detected by the nose, and the tooth is pushed out.

A simple anchoring of the dowel in the receiving opening is effected by the fact that the nose projects axially beyond the dowel bottom. Since the nose is provided on the dowel bottom and not on the periphery of the dowel, said nose can project relatively far and does not impede the insertion of the dowel.

Advantageously the nose can be inserted axially into the dowel. The simplest way to implement this feature is for the nose to axially proceed the dowel as a feeler and to detect the bottom of the opening. Hence, the nose prevents the dowel from not being pushed far enough into the receiving opening so that eventually the anchoring takes place only insufficiently. The nose is also used to control the radial force of the tooth. The nose is also used as a quasi transmission gear.

A further development provides that when the nose is inserted, the tooth projects in a sawtooth shape beyond the outer peripheral side of the dowel. The tooth flanks are arranged in such a way that they form a flank in the direction of the bottom and exhibit a negative flank in the direction of the connecting element orthogonally to the longitudinal axis.

The engineering object described in the introductory part is achieved, according to a fifth variant of the invention, by a fastening device comprising a dowel and a connecting element, fixed on the dowel, for fastening a first furniture part to a second furniture part, in that the dowel can be mounted in a blind hole or in a passage opening of the one furniture part and can be fixed by the connecting element, wherein the dowel has at least two dowel elements, and the dowel can be brought axially into its end position by the connecting element.

The use of two dowel elements has the advantage that the one dowel element can be used to fix the other dowel element in the receiving opening. When the dowel is pushed into the receiving opening, the one dowel element is not effective. Not until the dowel is pulled out of its end position does the one dowel element unfold its effectiveness by tilting and/or by pushing the other dowel element radially outwards, so that said other dowel element is braced against the wall of the receiving opening.

In one preferred embodiment of the invention it is provided that the connecting element is provided on or fastened to at least one of the dowel elements or to the dowel bottom. The connecting element can be used, on the one hand, to insert the dowel into the receiving opening and, on the other hand, to specifically use the force to fix the dowel in the receiving opening and to transfer this force to the dowel or the dowel element.

In a particular further development the dowel elements are connected to each other by a dowel bottom that lies opposite the free end of the connecting element. The dowel bottom is formed by the two dowel elements and engages the dowel elements, when the dowel has been completely inserted into the receiving opening and occupies its end position, in the receiving opening, in that their peripheral wall is anchored in the wall of the receiving opening.

In one embodiment it is provided that the dowel elements are divided into circular segment-like sections by axial incisions. The incisions make it possible for the dowel elements to be mutually tilted or shifted. At the same time said dowel elements occupy a smaller outside diameter in the one tilted position than in the other tilted position, so that the two dowel elements are moved from the one into the other tilted position via the connecting element. The one dowel element can form a section of a bearing or a bearing shell for a section of the other dowel element.

In order to optimally anchor the dowel in the receiving opening, in particular, in its opening wall, the dowel elements have on their radial outer faces at least one sawtooth-like, in particular, circumferential tooth that points away from the connecting element. This at least one tooth penetrates into the wall of the receiving opening and holds the dowel fixed. In this case the one dowel element itself can form the at least one tooth.

A further development provides that the dowel elements, which exhibit at least one tooth, are pre-stressed radially outwards in a springy manner. This feature ensures that the dowel elements pivot automatically into the anchoring position, as soon as the dowel has reached its end position.

According to the invention, the dowel elements, which exhibit at least one tooth, and/or the tooth is/are made of steel, in particular, high quality steel. The use of steel or preferably high quality steel as a general principle for the fastening device has the advantage that, on the one hand, large retaining forces can be generated on the part of the dowel with respect to the receiving opening; and, on the other hand, however, high connecting forces of the two furniture parts can also be generated.

The engineering object described in the introductory part is achieved, according to a sixth variant of the invention, by a fastening device comprising a dowel and a connecting element, fixed on the dowel, for fastening a first furniture part to a second furniture part, in that the dowel can be mounted in a blind hole or in a passage opening of the one furniture part and can be fixed by the connecting element, wherein the dowel and the connecting element are composed of one part; the dowel has a radially projecting tooth; and after the dowel has been inserted at least partially into the blind hole or the passage opening, the dowel can be tilted via the connecting element, so that the tooth digs into the wall of the blind hole or the passage opening.

Even in this alternative design of the invention the dowel is anchored and fixed in the receiving opening by a radially projecting tooth, where in this case the tooth and the dowel are integrally formed. As a result, the tooth can be pushed with great force into the wall of the receiving opening.

In a preferred further development of the invention it is provided that the dowel is formed in the shape of a disk at least in sections and that the connecting element projects radially and the tooth tangentially. The axis of the connecting element intersects the center of the disk-shaped dowel and is at a radial distance from the tooth, which is more or less orthogonal from the connecting element.

In order to place the disk-shaped dowel centrally and securely in the wall of the receiving opening, the dowel has protrusions, projecting from its flat side faces, in the form of disk sections. These protrusions rest in quasi points against the opening wall and make it possible to insert the dowel easily into the receiving opening. However, said protrusions also allow the dowel to tilt following its insertion, since the dowel can be easily rotated about the contact points.

The easy insertion and tilting are facilitated by the feature that the protrusions, which have the shape of disk sections, have a thickness that is 25% to 75%, in particular, half the thickness of the disk-shaped dowel. The valley-shaped regions next to the disk section-shaped protrusions are also used, among other things, to receive the material, in particular, the wood or wood-like or wood-containing material that is squeezed out when the tooth is pushed into the wall of the receiving opening.

A further development of the fastening device of the invention provides that the bent surface of the disk section-shaped protrusions is bent in a spherical shape. As a result, the surface is also curved transversely to its circular contour and has, in particular, the same curvature.

According to the invention, the disk section-shaped protrusions extend in a plane that is inclined by 5% to 45%, in particular, by 25% relative to the connecting element. This inclination is chosen in such a way that, when the dowel is inserted into the receiving opening, the disk section-shaped protrusions are tilted relative to the axis of insertion and, after the tilting of the loop, tilt in the other direction. This arrangement allows the dowel to be locked to an even greater extent in the receiving opening.

A further development of the fastening device of the invention provides that the bent surface of the disk-shaped dowel is bent in a spherical shape. Therefore, the surface is also curved transversely to its circular contour and has, in particular, the same curvature. As a result, the surface of the disk-shaped dowel and the surface of the disk section-shaped protrusions have the same curvature in space. The dowel is designed advantageously so as to be partially spherical and exhibits the valley-shaped incisions.

The objective of an easier anchoring of the dowel in the wall of the receiving opening is achieved by the feature that the radially projecting tooth has a tooth cutting edge. The tooth cutting edge allows the tooth to penetrate much more easily into the material of the furniture part, which receives the dowel, due to the fact that it can easily sever the fibers and displace said fibers to both sides of the tooth, in particular, into the valley-shaped incisions.

In this respect the tooth is partially ground on at least one side. Due to the grinding, the tooth has a wedge shape that facilitates the penetration of the tooth into the material of the furniture part that surrounds said tooth.

One embodiment of the invention provides that the side that is partially ground on one side protrudes away from the connecting element. The tooth cutting edge serves not only the purpose that the tooth can easily penetrate into the material. After the partial penetration, said tooth cutting edge also acts as a pivot bearing, about which the dowel is pivoted, so that the tooth points in the pull-out direction and serves as a barb.

Other advantages, features and details of the invention will become apparent from the following description, in which several exemplary embodiments of the invention will be described with reference to the drawings. In this case the features, which are disclosed in the claims and the description and depicted in the drawings, may be essential for the invention in any and all combinations.

DETAILED DESCRIPTION

Figure 1:
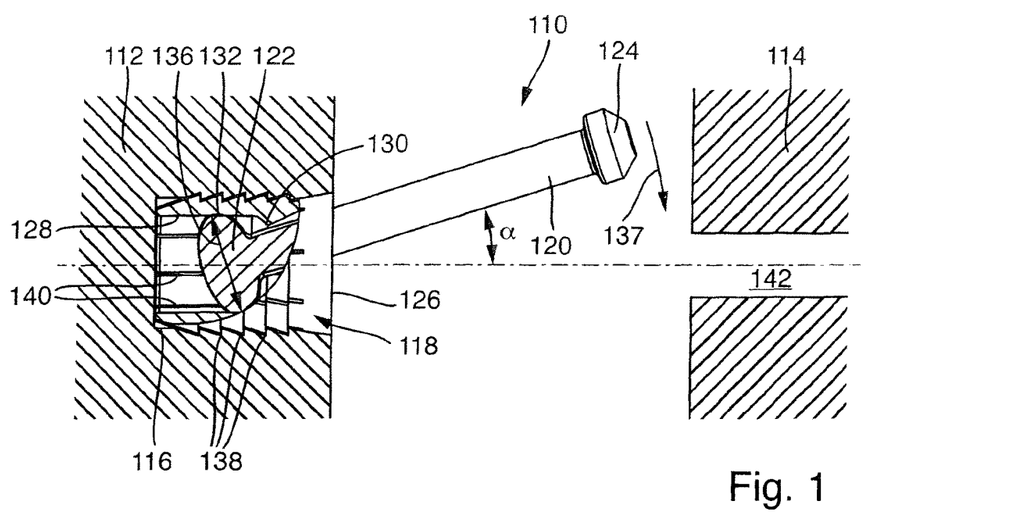
FIG. 1 is a side view (partially cut) of the inventive fastening device according to a first embodiment of a first variant in the installed position.

FIG. 1 shows a first variant of the invention in accordance with a first exemplary embodiment, where a fastening device is denoted with the reference numeral 110. This fastening device 110 can be used, for example, to connect two furniture parts 112 and 114 (only depicted by indication) to each other by introducing a blind hole 116 or a passage opening, into which a dowel 118 is pushed, in the first furniture part 112. The dowel 118 is provided in advance with a connecting element 120, which stays with its one end 122 in the dowel 118 and with its other, free end 124 issues from the dowel 118 and projects axially beyond said dowel.

The dowel 118 is formed in the manner of a sleeve, so that the end 122 of the connecting element 120 can be fixed in the dowel 118 by the rear end that is located in the furniture part 112. In addition, the dowel 118 has an edge 126, which is located opposite the rear end and which terminates flush with the blind hole 116.

The sleeve-shaped dowel 118 has a receiving space 128, in which the end 122 of the connecting element 120 is positioned. The receiving space 128 has a circularly round cross-section, which tapers off in the direction of the edge 126 and forms an inner circumferential bead 130. Between this inner circumferential bead 130 and the free end of the dowel 118, which is formed by the edge 126, the receiving space 128 expands again in the shape of a truncated cone.

It can be seen very clearly in FIG. 1 that the end 122 of the connecting element 120 that is located in the receiving space 128 is designed ellipsoid and rests with its line of contact 132 against the inner side of the receiving space 128. The connecting element 120 is tilted by the angle α with respect to the axial longitudinal axis 134 of the dowel 118, so that the ellipsoid end 122 in the receiving space 128 is also tilted. The main longitudinal axis 136 of the ellipsoid end 122 lies in the axis of tilt of the connecting element 120 that corresponds to the plane of the drawing.

Loss of the connecting element 120 by the dowel 118 is prevented by the inner circumferential bead 130 that holds back the end 122. In addition, it can also be seen in FIG. 1 that the receiving space 128, which expands in the manner of a truncated cone in the direction of the edge 126, allows the connecting element 120 to be pivoted by the angle α.

If the connecting element 120 is swiveled in the direction of the longitudinal axis 134 of the dowel 118, which is indicated with the arrow 137, then the ellipsoid end 122 positions itself in the receiving space 128. Since the main longitudinal axis 136 of the ellipsoid end 122 is now orthogonal to the longitudinal axis 134 of the dowel 118, the receiving space 128 is expanded by the end 122; and the wall sections of the dowel are pushed radially outwards. The result is that the sawtooth-like teeth 138 bite into the material of the furniture part 112 and fix the dowel 118 in the blind hole 116.

The flexibility of the dowel 118 is enhanced with respect to its radial direction; and the displacement of the wall sections of the dowel is made easier by providing the dowel wall with axial slots 140. If the connecting element 120 is located in the longitudinal axis 134 of the dowel 118, then the other furniture part 114 can be pushed onto the connecting element 120; and the end 124 can be anchored in a way that is not shown in the receiving space 142 of the other furniture part 114. Then the two furniture parts 112 and 114 are connected to each other; and the connecting element 120 is secured against tilting.

Figure 2:
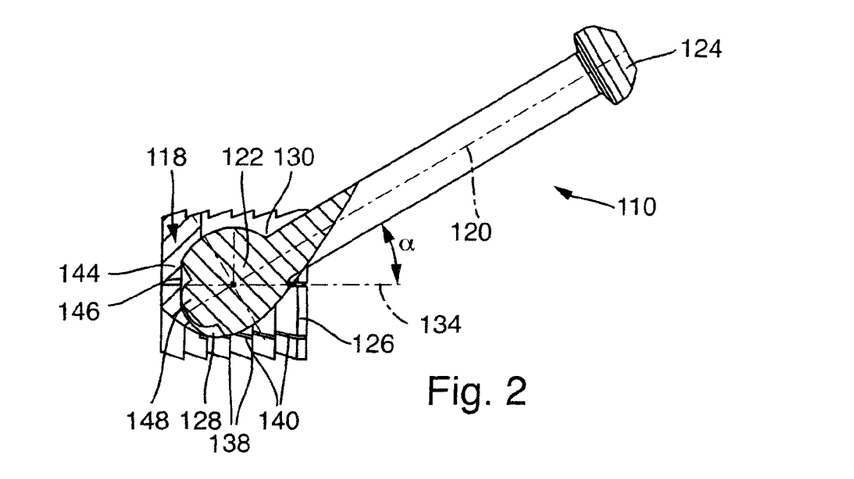
FIG. 2 is a side view (partially cut) of another embodiment of the invention in the installed position.
Figure 3:
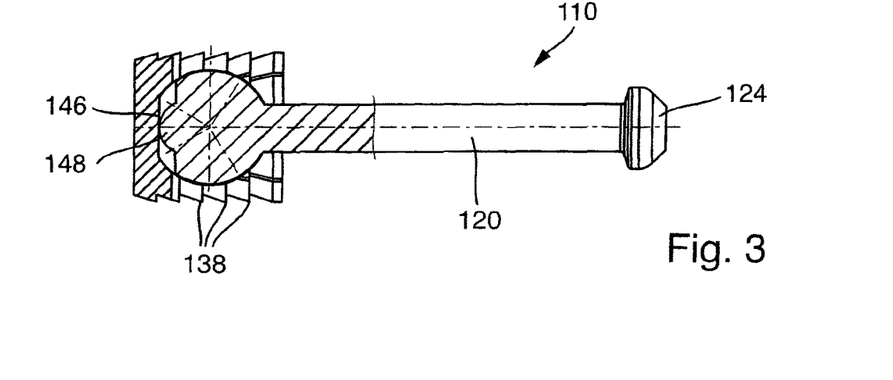
FIG. 3 is a side view of the variant from FIG. 2 in the end position.

FIGS. 2 and 3 show a second exemplary embodiment of the first variant of the invention, where in this case identical components are labeled with the same reference numerals. The free end 122 of the connecting element 120 is formed partially spherical and sits in a cup-shaped receiving space 128 of the dowel 118. The dowel 118 itself is designed in the shape of a pot and has a pot bottom 144. It can be seen that the cup-shaped receiving space 128 has a flattening 146 on the pot bottom 144. In this embodiment, too, the receiving space 128 of the dowel 118 tapers off in the direction of the edge 126 and forms an inner circumferential bead 130. Between this inner circumferential bead 130 and the free end of the dowel 118, which is formed by the edge 126, the receiving space 128 expands again in the shape of a truncated cone.

In addition, it can be seen that the partially spherical, free end 122 of the connecting element 120 is provided with an axial thickening 148, which in the installed position, shown in FIG. 2, i.e., with the connecting element 120 tilted, is located in the transition of the cup-shaped receiving space 128 to the flattening 146.

If the connecting element 120 is pivoted by the angle α, so that it comes to rest coaxially to the longitudinal axis 134 of the dowel 118, then the thickening 148 is pushed onto the flattening 146 and displaces the partially spherical, free end 122 axially in the direction of the inner circumferential bead 130 and the edge 126. At the same time the cup-shaped receiving space 128 is deformed in such a way that it is spread apart in the region of the inner circumferential bead 130. This feature is supported by the axial slots 140, which continue as far as into the edge 126 and taper off freely. The result is that the sawtooth-like teeth 138 dig into the material of the furniture part 112 and fix the dowel 118 in the blind hole 116. At this point the connecting element 120 may be found in the longitudinal axis 134 of the dowel 118, so that the other furniture part 114 can be pushed onto the connecting element 120, and the end 124 can be anchored in the receiving space 142. Then the two furniture parts 112 and 114 are connected to each other, and the connecting element 120 is secured against tilting.

Figure 4:
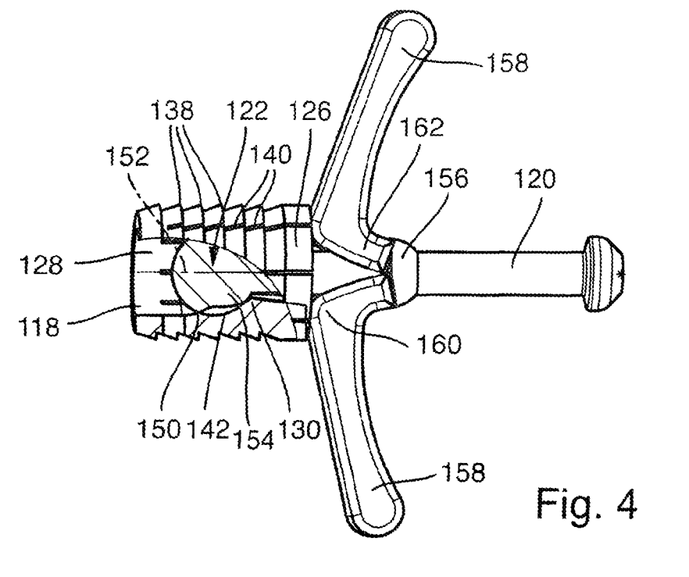
FIG. 4 is a side view (partially cut) of another embodiment of the invention in the end position with the assistance of an assembly tool.

FIG. 4 shows an additional exemplary embodiment of the first variant of the invention, where in this case identical components are labeled with the same reference numerals. The dowel 118 is designed in the shape of a sleeve and has a receiving space 142, which is provided with two inner circumferential beads 130 and 150, where the second inner circumferential bead 150 faces away from the edge 126. The partially cup-shaped receiving space 142, in which the free end 122 comes to rest in the end position, is formed between the inner circumferential beads 130 and 150.

The free end 122 has a terminal, partially spherical section 152, which passes over into a cylindrical section 154 with a smaller diameter. The transition from the partially spherical section 152 into the cylindrical section 154 is effected by way of a tapering ramp. Similarly the transition on both sides of the inner circumferential bead 150 and the inner circumferential bead 130 is also implemented in each instance in a ramp-like manner.

If the connecting element 120 is inserted into the dowel 118 starting from the inner end in the furniture part 112, then the partially spherical section 152 rests on the opposite side of the inner circumferential bead 150 in the cylindrical portion of the receiving space 128.

At the central section of the connecting element 120 between the two ends 122 and 124 there is a thickening or a peripheral bead 156 outside the dowel 118. Two L-shaped levers 158, which are braced with their knee 160 against the edge 126 of the dowel 118, engage with said circumferential bead. Pivoting the lever 158 and setting up the lever foot 162, which engages with the circumferential bead 156, brings about an axial displacement of the connecting element 120, in that this connecting element is pulled out of the dowel 118. At the same time the partially spherical section 152 is pushed, as indicated in FIG. 4, over the ramp in the direction and finally over the inner circumferential bead 150, so that the partially spherical section 152 comes to rest between the two inner circumferential beads 150 and 130 in the partially cup-shaped receiving space 142.

Since the partially cup-shaped receiving space 142 has a smaller inner circumferential diameter than the cylindrical section of the receiving space 128, the wall sections of the dowel are displaced radially outwards, and the dowel 118 expands radially. This is facilitated in turn by the slots 140, which extend in the longitudinal direction and are open in the direction of the edge 126, so that the sawtooth-like teeth 138 can dig into the material of the first furniture part 112, surrounding the dowel 118, in the best way possible.

Figure 5:
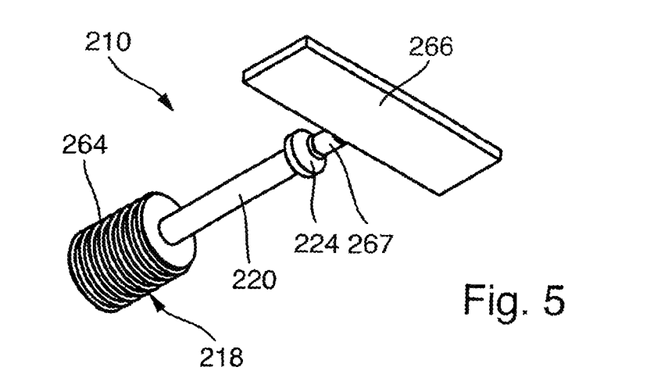
FIG. 5 is a perspective view of the inventive fastening device according to a second variant.

FIG. 5 shows a second variant of the invention, where a fastening device is denoted with the reference numeral 210. This fastening device 210 can be used, for example, to connect two furniture parts (not shown) to each other by introducing a blind hole or a passage opening, into which a dowel 218 is pushed, in the first furniture part. The dowel 218 has a connecting element 220, which is integrally connected to said dowel; in particular, the two elements are composed of one piece. In this case the dowel 218 can be made solid or hollow.

The dowel 218 is designed in the shape of a cylinder and has an external thread 264, which is designed, for example, to be self-tapping. Coaxially from the dowel 218 there extends the connecting element 220, which has an end 224, which points away from the dowel 218 and which is later anchored in the second furniture part. On this end 224 there is in the axial direction a lug 266, the radial dimension of which has a length that is equivalent to 100% to 500%, in particular, 150% to 300%, preferably 200% of the diameter of the dowel 218. This lug 266 can be used to transfer a torque to the connecting element 220 and to the dowel 218 in a simple and easy way. In order to limit the torque to be transferred, a predetermined breaking point 267, which breaks upon reaching the maximum torque, is located between the connecting element 220 and the lug 266. As a result, the fastening device 210 of the invention can be mounted manually.

Figure 6:
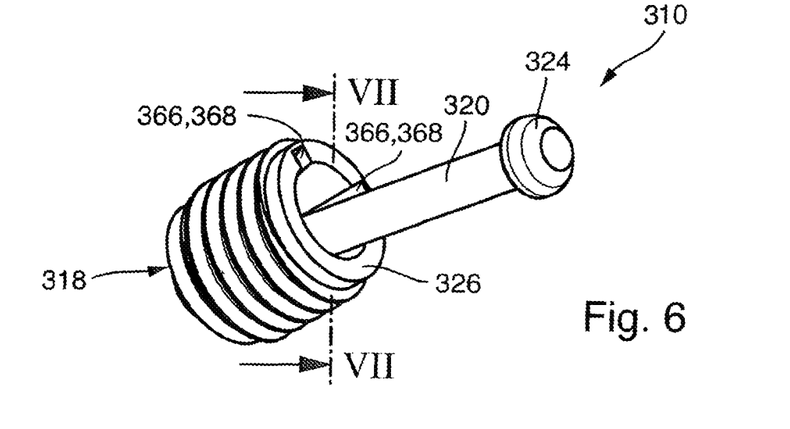
FIG. 6 is a perspective view of the fastening device according to a third variant of the invention.
Figure 7:
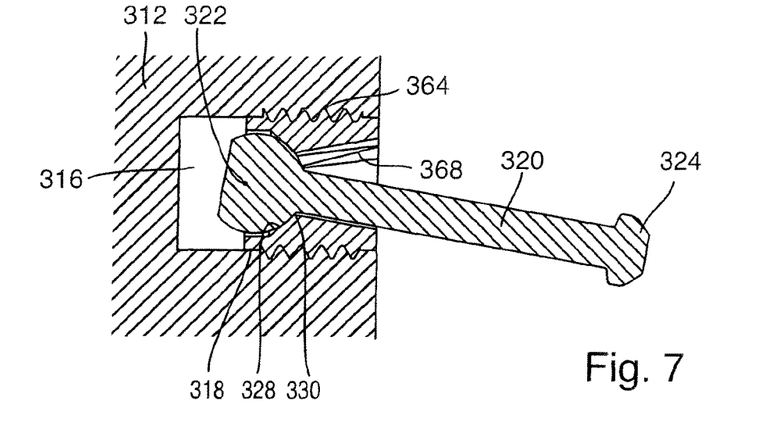
FIG. 7 is a longitudinal view of the variant according to FIG. 6.

FIGS. 6 and 7 show a third variant of the invention, where a fastening device is denoted with the reference numeral 310. This fastening device 310 can be used, for example, to connect two furniture parts to each other by introducing a blind hole 316 or a passage opening, into which a dowel 318 is pushed, in the first furniture part 312 (which is shown only by indication). The dowel 318 is provided in advance with a connecting element 320, which stays with its one end 322 in the dowel 318 and with its other, free end 324 emerges from the dowel 318 and projects axially beyond said dowel. The dowel 318 is designed in a sleeve-like manner, so that the connecting element 320 can be pushed into the dowel 318 from the rear end that is located in the furniture part. In addition, the dowel 318 has an edge 326, which lies opposite the rear end and which terminates flush with the blind hole 316. The dowel 318 is designed in a cylindrical shape and has an external thread 364, which is designed, for example, to be self-tapping.

It can be seen in FIG. 7 that the end 322 of the connecting element 320 is designed in the shape of a partial sphere and is pivotably guided in a partially cup-shaped receiving space 328 in the dowel 318. The partially cup-shaped receiving space 328 tapers off in the direction of the edge 326 and forms an inner circumferential bead 330, starting from which it then expands again in the shape of a truncated cone as far as up to the edge 326.

FIG. 6 shows that, starting from the edge 326, there are two grooves 368, which are designed as tool engagement faces 366 and which extend in the axial direction on the inner circumferential face of the dowel 318. The grooves 368 are located in the truncated cone-shaped section of the receiving space 328 and are offset from each other by 90 deg. with respect to the longitudinal axis of the dowel 318.

A suitable tool, for example, a screwdriver or a Phillips screwdriver or the like, can be inserted into these grooves 368, when the connecting element 320 is tilted, as shown in FIGS. 6 and 7, away from the grooves 368 in the truncated-cone shaped section of the receiving space 328. This tool, which can be inserted into the grooves 368, can be used to rotate the dowel 318 into the blind hole 316 of the furniture part 312.

Figure 8:
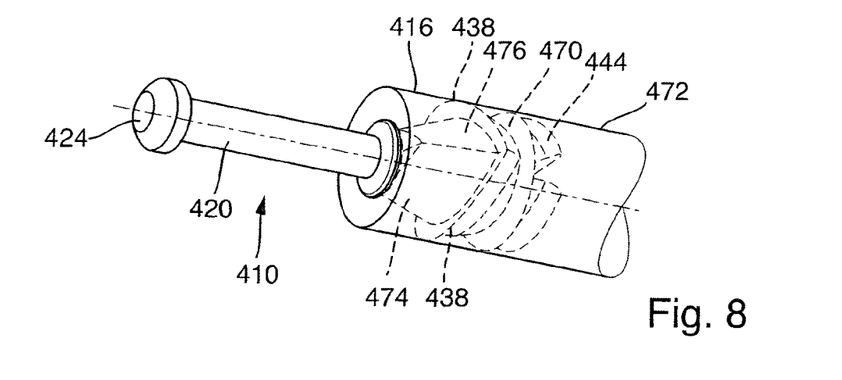
FIG. 8 is a perspective view of the inventive fastening device according to a fourth variant in the installed position.
Figure 9:
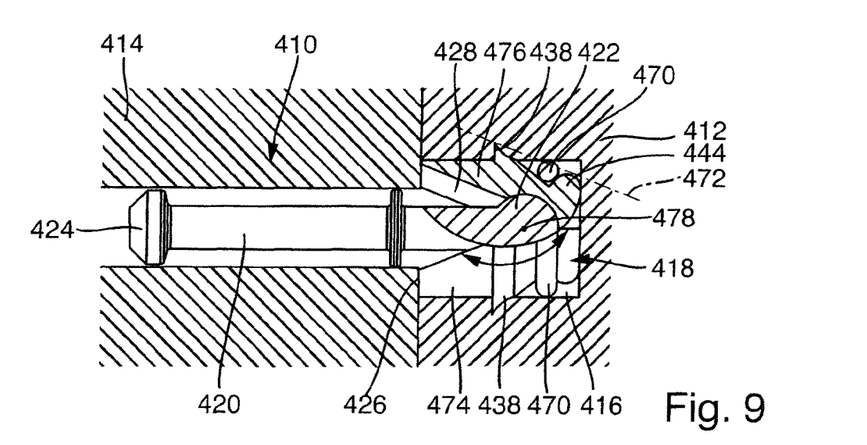
FIG. 9 is a longitudinal view of the variant according to FIG. 8 in the end position.

FIGS. 8 and 9 show a fourth variant of the invention in accordance with a first exemplary embodiment, where a fastening device is denoted with the reference numeral 410. This fastening device 410 can be used, for example, to connect two furniture parts 412 and 414 (which are shown only by indication) to each other by introducing a blind hole 416 or a passage opening, into which a dowel 418 is pushed, in the first furniture part 412. The dowel 418 is provided in advance with a connecting element 420, which is mounted with its one end 422 in the dowel 418 and with its other, free end 424 emerges from the dowel 418 and projects axially beyond said dowel. The dowel 418 is composed essentially of two parts, where in this case the two dowel elements 474 and 476 are mounted in such a way that they can pivot about the end 422 of the connecting element 420. In addition, the dowel 418 has an edge 426, which is opposite the rear end and which terminates flush with the blind hole 416.

The two dowel elements 474 and 476 are designed in the manner of a pot bottom and like a clamp, and have a pot bottom 444, which faces in the direction of the bottom of the blind hole 416 and which closes off a receiving space 428 on the side of the bottom and defines a cup-shaped section, in which the spherical end 422 of the connecting element 420 sits. Each of the faces, which face each other, of the two dowel elements 474 and 476 has an obtuse angle δ of 155 deg. and can be swiveled about the center 478 of the spherical end 422 of the connecting element 420.

In FIG. 8, which shows the installed position, the sections, which face the connecting element 420, of both dowel elements 474 and 476 abut each other, so that the sections, which face the bottom of the blind hole 416, are spaced apart from each other. In this pivot position the peripheral edge of the pot bottom 444, a spring element, in particular, an R ring 470 as well as a circumferential tooth 438 touch the inner circumferential face of the blind hole 416 along a line 472. The dowel 418 can be pushed into the blind hole 416.

As soon as the dowel 418 strikes against the bottom of the blind hole 416, the two dowel elements 474 and 476 are pivoted about the center 478 of the spherical end 422 of the connecting element 420; and the sections, which face the bottom of the blind hole 416, of the two dowel elements 474 and 476 abut each other. This position of the two dowel elements 474 and 476 is shown in FIG. 9, where in this case the line 472 is used to indicate the alignment of the peripheral edge of the pot bottom 444, the O ring 470 as well as the circumferential tooth 438. At this point the tooth 428 bites into the material of the furniture part 412 and fixes the dowel 418 in the blind hole 416. In addition, this position of the two dowel elements 474 and 476 is supported by the O ring 470, which holds the two sections, which face the bottom of the blind hole 416, of the two dowel elements 474 and 476 side by side in contact position.

Figure 10:
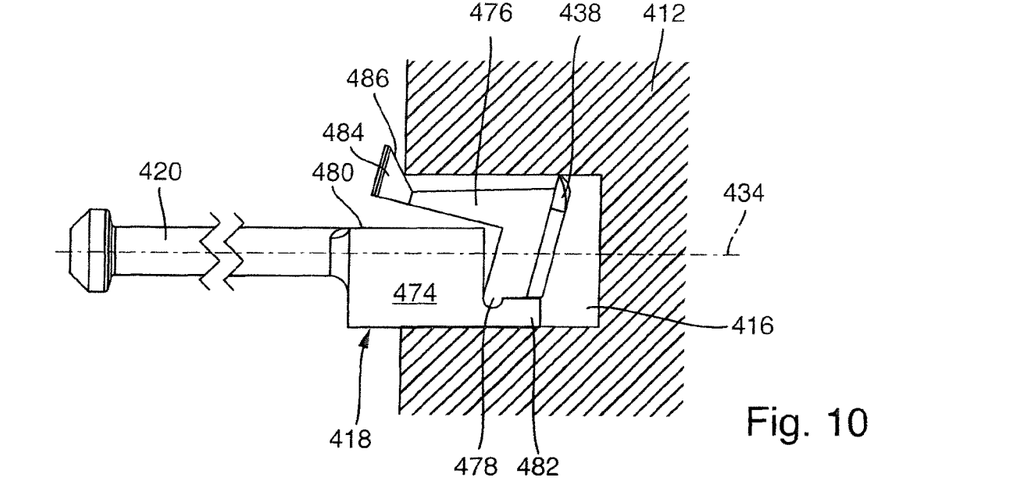
FIG. 10 is a side view of the inventive fastening device according to another embodiment of the fourth variant.
Figure 11:
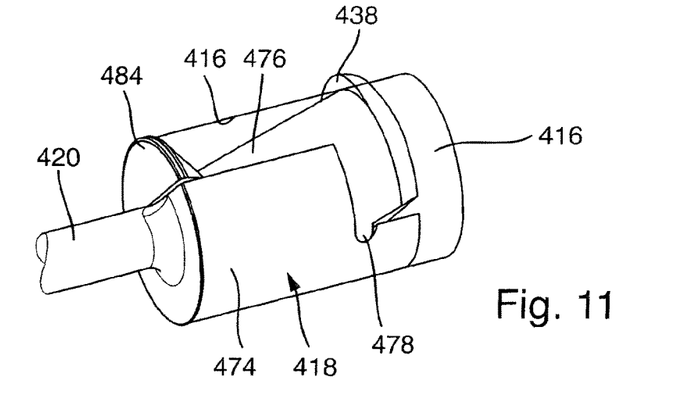
FIG. 11 is a perspective view of the variant according to FIG. 10.

FIGS. 10 and 11 show a fourth variant of the invention in accordance with a second exemplary embodiment. In this case the dowel 418 is also composed of two parts, where the connecting element 420 and a dowel element 474 are integrally formed; and the other dowel element 476 is pivotably mounted via a hinge 478 on the first dowel element 474. The first dowel element 474 has a partially cylindrical body having a side, which faces the bottom of the blind hole 416 and at which a continuation 482, which is located opposite and orthogonal to the section plane 480, is formed. Said continuation bears the bearing of the hinge 478.

The second dowel element 476 is designed in an L shape or is angled. In this case the long leg lies more or less parallel to the longitudinal axis 434 of the dowel 418 and faces the section plane 480. The short leg engages behind the partially cylindrical body of the first dowel element 474 and ends as the bearing bolt for the hinge 478. On the outer side of the knee of the second dowel element 476 there is a radially projecting tooth 438, which lies more or less opposite the hinge 478. The free end of the long leg is provided with a radially projecting control arm 484. The tooth 438 lies in the axial direction, seen with respect to the hinge 478, on the one side, facing the bottom of the blind hole 416; and the control arm 484 faces the opening of the blind hole 416.

In the installed position of the dowel 418 the second dowel element 476 is tilted in such a way that the tooth 438 faces the bottom of the blind hole 416; and the long leg of the second dowel element 476 faces away from the section plane 480 of the first dowel element 474. In this installed position the control arm 484 occupies a position, in which it is radially the farthest away from the longitudinal axis 434. In contrast, the tooth 438 occupies a position, in which it occupies its radially smallest distance from the longitudinal axis 434. The dowel 418 can be pushed into the blind hole 416 until the control arm 484 strikes against the edge of the blind hole 416. Since the control arm 484 has an approach slope 486, said control arm is displaced radially in the direction of the longitudinal axis 434 by pushing the dowel 418 further into the blind hole 416, as a result of which the tooth 438 is pushed radially outwards and eventually into the material of the furniture part 412.

When the dowel 418 has been fully inserted into the blind hole 416, its end position is reached, and the control arm 484 is also in the blind hole 416. The long leg rests against the section plane 480 of the first dowel element 474; and the tooth 438 is maximally buried in the material of the furniture part 412. An extraction of the dowel 418 is prevented, because the tooth 438 cannot be withdrawn, and the second dowel element 476 cannot be tilted.

Figure 12:
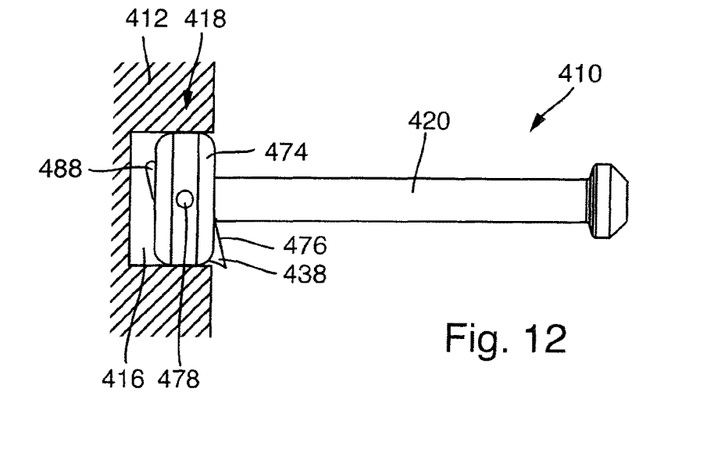
FIG. 12 is a side view of the inventive fastening device according to another embodiment of the fourth variant.
Figure 13:
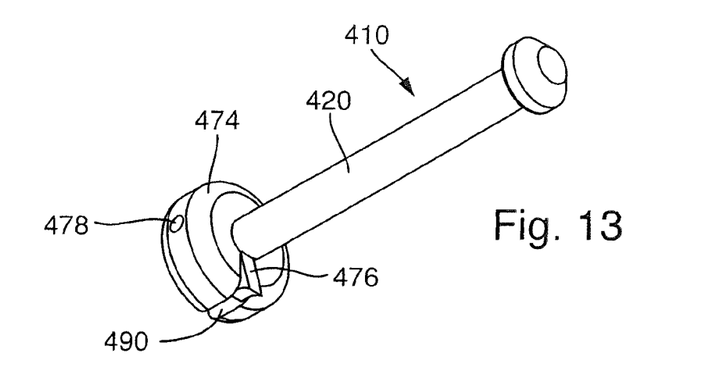
FIG. 13 is a perspective view of the variant according to FIG. 12.

FIGS. 12 and 13 show the fourth variant of the invention in accordance with a third exemplary embodiment. In this case the dowel 418 is also composed of two parts, where the connecting element 420 and a dowel element 474 are integrally formed or are made in one piece; and the other dowel element 476 is pivotably mounted via a pivot bearing 478 on the first dowel element 474.

The first dowel element 474 has a cylindrical body, wherein the pivot bearing 478 diagonally penetrates the body. The second dowel element 476 is penetrated more or less centrally by the pivot bearing 478 in such a way that the one part projects axially beyond the first dowel element 474 in the manner of a nose 488. The other part of the second dowel element 476 that lies opposite the pivot bearing 478 is designed as a tooth 438. In order to mount the second dowel element 476, the first dowel element 474 has a radial slot 490, through which the pivot bearing 478 extends. Thus, the second dowel element 476 can be guided in the first dowel element 474 in such a way that it shuttles back and forth in the slot 490.

In the installed position of the dowel 418 the nose 488 projects beyond the first dowel element 474 in the axial direction and is tilted towards the bottom of the blind hole 416, whereas the tooth 438 does not project beyond the peripheral surface of the first dowel element 474, but rather is tilted axially in the direction of the connecting element 420. As soon as the nose 488 strikes against the bottom of the blind hole 416, the second dowel element 476 is tilted about the pivot bearing 478. In so doing, the nose 488 is pushed axially into the slot 490; and the tooth 438 moves radially out and projects beyond the peripheral surface of the first dowel element 474. At the same time the tooth 438 digs into the material of the furniture part 412. An extraction of the dowel 418 is prevented, because the tooth 438 cannot be withdrawn, and the second dowel element 476 cannot be tilted.

Figure 14:
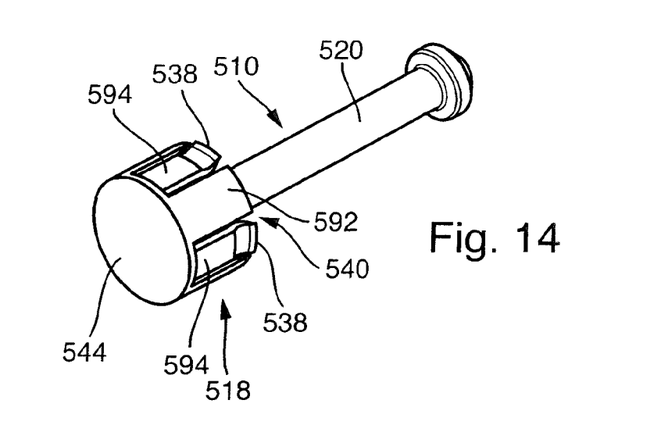
FIG. 14 is a perspective view of the inventive fastening device according to a fifth variant.
Figure 15:
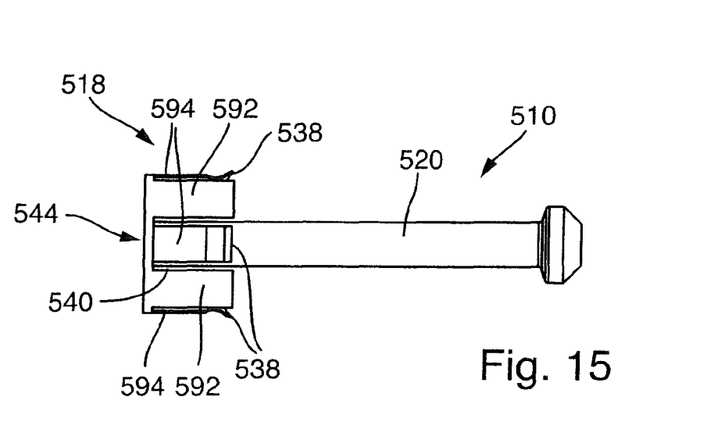
FIG. 15 is a side view of the variant according to FIG. 14.

FIGS. 14 and 15 show a fifth variant of the invention in accordance with a first exemplary embodiment, where a fastening device is denoted with the reference numeral 510. This fastening device 510 can be used, for example, to connect two furniture parts (not depicted) to each other by introducing a blind hole or a passage opening, into which a dowel 518 is pushed, in the first furniture part.

The dowel 518 has a connecting element 520, which is integrally connected to said dowel; and, in particular, the two elements are composed of one piece. In this case the dowel 518 is designed like a pot; and the connecting element 520 projects from the inner side of the bottom 544 of the pot. The pot wall has four first wall segments 592, which project axially from the pot bottom 544 and are arranged so as to be uniformly distributed. Between each of the first wall segments there is a springy second wall segment 594, which is also connected to the pot bottom 544 and extends parallel to the first wall segments 592.

The second wall segments 594 are designed so as to be springy in the radial direction and have a free end, which is designed like a cutting edge and which faces in the form of a tooth 538 radially outwards and away from the pot bottom 544. The first wall segments 592 are partially ground radially inwards on their free ends and also form a tooth 538. The first wall segments 592 can also be pre-stressed radially outwards with their teeth 538. Due to the fact that the dowel 518 is made of metal, in particular, high quality steel, the cutting edges of the teeth 538 are relatively sharp edged.

Axially extending slots 540 extend between the wall segments 592 and 594, so that the springy wall segments 592 and 594 can be deformed radially inwards. In the installed position the teeth 538 of the springy wall segments 594 project beyond the peripheral surfaces of the first wall segments 592, so that when the dowel 518 is inserted into the blind hole or the passage opening of the first furniture element, said teeth can be pushed in slightly in the radial direction. Then said teeth are under pre-stress. The end position is reached, as soon as the dowel 518 is fully pushed into the first furniture element. An extraction of the dowel 518 is prevented by the sawtooth-like teeth 538, which have a ramp that faces the pot bottom 544 and which under pre-stress engage like a wedge in the material, surrounding the dowel 518.

Figure 16:
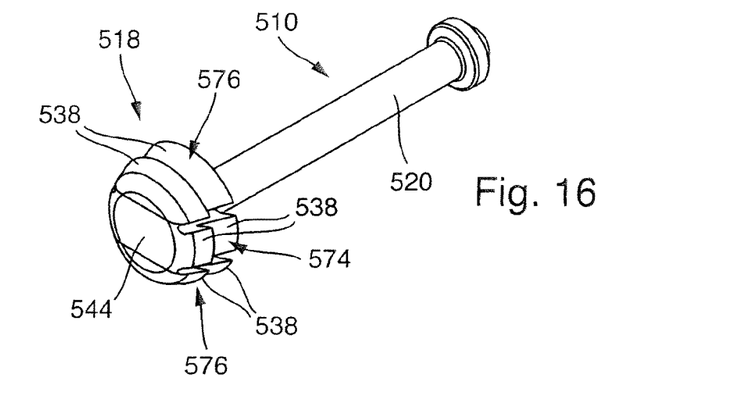
FIG. 16 is a perspective view of the inventive fastening device according to another embodiment of the fifth variant.
Figure 17:
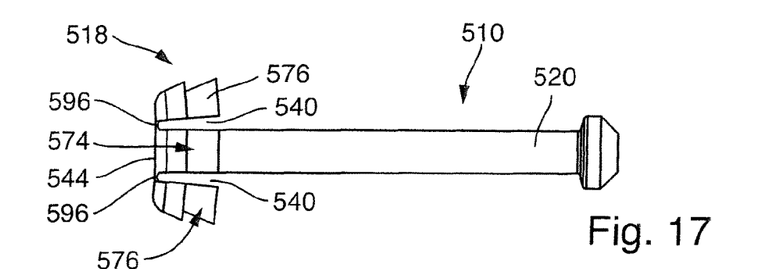
FIG. 17 is a side view of the variant according to FIG. 16.

FIGS. 16 and 17 show the fifth variant of the invention in accordance with a second exemplary embodiment. In this case the dowel 518 is designed to be solid and is composed of three parts, where in this case the connecting element 520 and a first dowel element 574 are composed of one part. The first dowel element 574 and the two second dowel elements 576, which flank the first dowel element 574 on both sides, are arranged more or less in the shape of a W and are connected to each other by a bottom 544 that lies opposite the connecting element 520. Two axial slots 540 extend between the dowel elements 574 and 576, so that the two second dowel elements 576 are connected to the bottom 544 in an elastic springy manner in the radial direction. This connection 596 can be made of thin walls or as a film hinge.

Furthermore, it can be seen in FIGS. 16 and 17 that each of the dowel elements 574 and 576 has on its peripheral surface two teeth 538, which are arranged one behind the other in the axial direction and which are designed in a sawtooth-like manner. The one ramp of said teeth faces the bottom 544; and the other tooth flank is orthogonal to the connecting element 510 or is even negatively tilted, i.e., forms a flute.

In the installed position the teeth 538 project beyond the diameter of the blind hole or the passage borehole of the first furniture element and are pushed in slightly radially when the dowel 518 is pushed into the blind hole or the passage opening, as a result of which the slot 540 is reduced in size. The end position is reached, as soon as the dowel 518 is pushed completely into the first furniture element.

When the dowel 518 is pulled out, the first dowel element 574 is then displaced slightly axially by the connecting element 520. This displacement has the effect on the connection 596 or on the film hinge that the second dowel elements 576 are tilted outwards about the film hinge, so that their teeth 538 dig further into the material of the first furniture part that surrounds said teeth.

Figure 18:
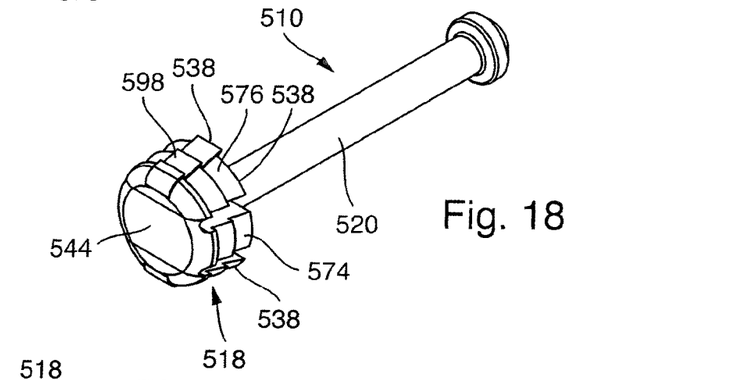
FIG. 18 is a perspective view of the inventive fastening device according to an additional embodiment of the fifth variant.
Figure 19:
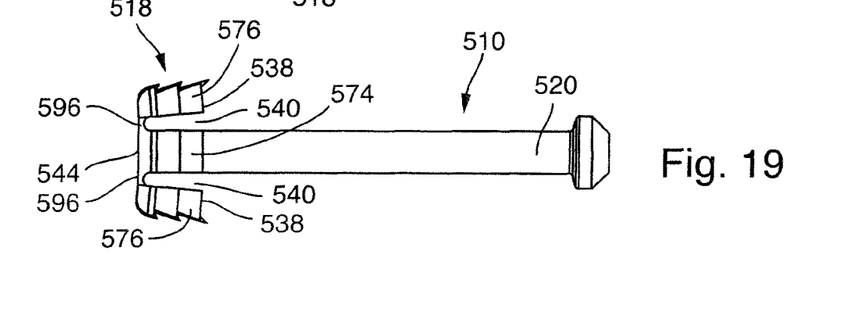
FIG. 19 is a side view of the variant according to FIG. 18.

FIGS. 18 and 19 show the fifth variant of the invention in accordance with a third exemplary embodiment. In this case, too, the dowel 518 is designed so as to be solid and is composed of three parts. In contrast to the exemplary embodiment shown in FIGS. 16 and 17, the first dowel element 574 and the two second dowel elements 576 have in each case three teeth 538, which lie one behind the other in the axial direction. Thus, the dowel elements 574 and 576 are composed of three teeth.

The two second dowel elements 576 are provided on their opposite sides and perpendicular to the slots 540 with axial grooves, in each of which there is a blade 598, which extends more or less axially and has three teeth 538. The blade is mounted so as to be springy in the radial direction. The teeth 538 of the blade 598 project beyond the teeth 538, adjacent to the blade 598, in the radial and axial direction. In this case the blade 598 can be made of steel, in particular, high quality steel or spring steel; and the rest of the dowel 518 and the connecting element 520 can be made of plastic, steel or high quality steel.

FIGS. 20 to 23 show a sixth variant of the invention, where a fastening device is denoted with the reference numeral 610. This fastening device 610 can be used, for example, to connect two furniture parts 612 and 614 (shown only by indication) to each other by introducing a blind hole 616 or a passage opening, into which a dowel 618 is pushed, in the first furniture part 612. The dowel 618 has a connecting element 620, which is integrally connected to said dowel; and, in particular, the two elements are composed of one piece.

Figure 20:
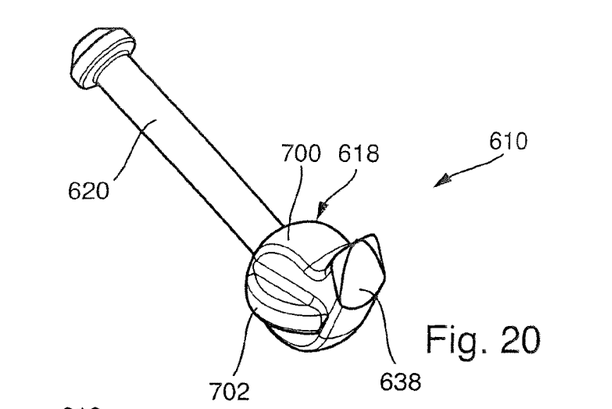
FIG. 20 is a perspective view of the inventive fastening device according to a sixth variant.

The dowel 618 is designed more or less spherical and has a disk-shaped body 700, in the plane of which the connecting element 620 lies and projects radially therefrom. A tooth 638 also projects from this body 700, but this tooth extends in the tangential direction and lies opposite the connecting element 620.

Each of the two flat side faces of the body 700 has a disk section-shaped protrusion 702, which projects radially. It is easy to see in the drawing, in particular, in FIG. 23 that the protrusion 702 has a thickness that is half as great as the thickness of the body 700 or the thickness of the tooth 638. In addition, it can be seen that the surfaces of the body 700 and the protrusions 702 are curved in a spherical manner, so that they can nestle against the inner surface of the blind hole 616.

Figures 21, 22, 23:
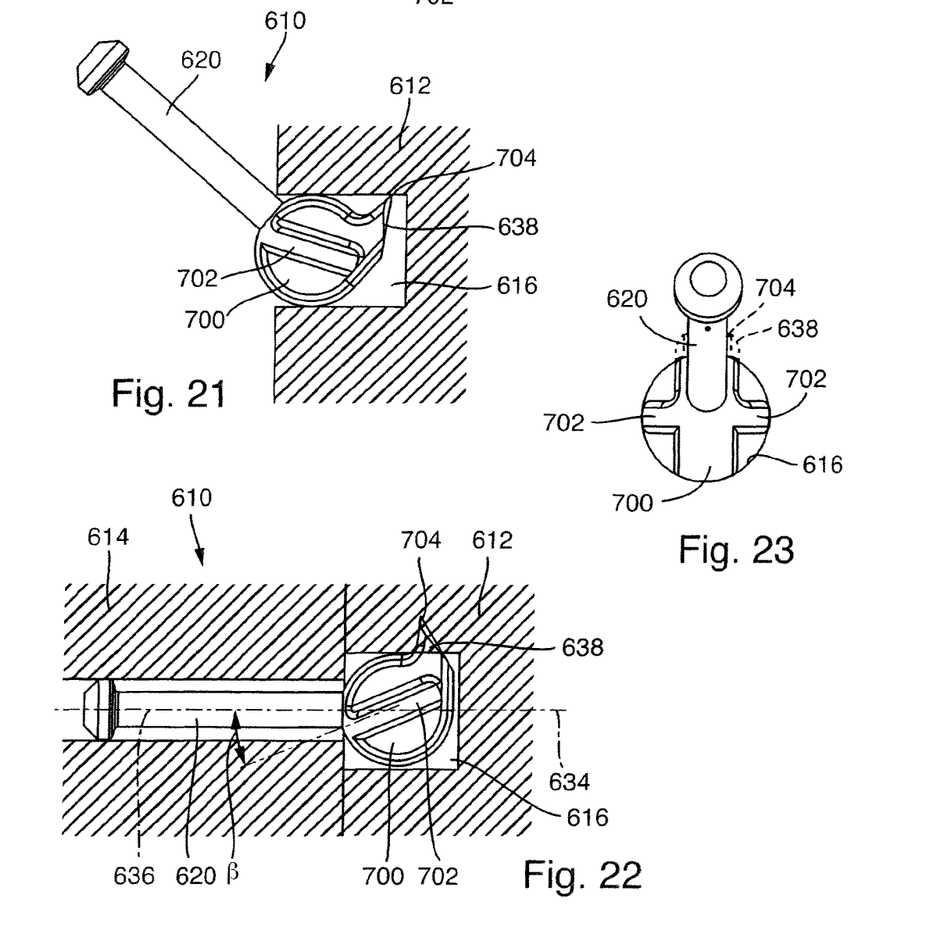
FIG. 21 is a side view of the variant according to FIG. 20 in the installed position.
FIG. 22 is a side view of the variant according to FIG. 20 in the end position.
FIG. 23 is a side view in the direction of the arrow XXIII according to FIG. 21.

In addition, it can be seen, in particular, in FIG. 22 that the plane of the protrusions 702 is tilted by an angle β of about 25 deg. with respect to the longitudinal axis 634 of the dowel 618. Furthermore, the tooth 638 has a tooth cutting edge 704 having a tooth flank, which projects perpendicular from the surface of the body 700, and having another tooth flank, which is more or less tangential to the body 700.

In the installed position the fastening device 610 is pivoted, as shown in FIG. 21, with its body 700 into the blind hole 616 in such a way that the body 700 with the tooth 638 leading can be inserted into the blind hole 616. As soon as the connecting element 620 strikes against the edge of the blind hole 616, it is tilted about the tooth cutting edge 704. As a result, on the one hand, the tooth cutting edge 704 digs into the material of the first furniture part 612 in that the body 700 is braced against the inner wall of the blind hole 616 on the side opposite the tooth 638 and at the same time pushes into the blind hole 616. This occurs until the tooth 638 reaches its end position and is orthogonal to the longitudinal axis 634 of the blind hole 616; and the body 700 is located in its entirety in the blind hole 616.

At this point the main longitudinal axis 636 of the connecting element 620 lies coaxially to the longitudinal axis of the blind hole 616. In addition, the tangential section of the tooth 738 rests against the bottom of the blind hole 616. Since the body 700 and the protrusions 702 are designed, on the one hand, in the form of a disk and their peripheral faces are designed spherical, the dowel 618 can be tilted in the blind hole 616.

What is claimed is:

1. A fastening device, comprising:
    a dowel mountable in a blind hole or in a passage opening of a first furniture part, the dowel comprising an external thread and tool engagement faces into which a tool is insertable to rotate the dowel into position in the blind hole or passage opening; and
    a connecting element fixed on the dowel in advance of the dowel being fixable in the blind hole or in the passage opening of the first furniture part to fasten the first furniture part to a second furniture part,
    wherein the tool engagement faces comprise first and second grooves extending axially along the dowel offset from one another by 90°, and
    wherein the grooves are open radially inwards.

2. The fastening device of claim 1, wherein the grooves are open axially in a direction of the connecting element.

3. The fastening device of claim 1, wherein the grooves are shaped to receive a screwdriver.

4. A fastening device, comprising:
    a dowel mountable in a blind hole or in a passage opening of a first furniture part, the dowel comprising an external thread and tool engagement faces into which a tool is insertable to rotate the dowel into position in the blind hole or passage opening; and
    a connecting element fixed on the dowel in advance of the dowel being fixable in the blind hole or in the passage opening of the first furniture part to fasten the first furniture part to a second furniture part,
    wherein the connecting device has a spherically-shaped end located in the dowel and the dowel comprises a ball cup that receives and holds the spherically-shaped end, and
    wherein the ball cup tapers in a direction of the connecting element.

5. The fastening device of claim 4, wherein the ball cup of the dowel is connected to a truncated cone having an opening enabling the connecting element to be tilted away from the grooves.

6. A fastening device, comprising:
    a dowel mountable in a blind hole or in a passage opening of a first furniture part, the dowel comprising an external thread and tool engagement faces into which a tool is insertable to rotate the dowel into position in the blind hole or passage opening; and
    a connecting element fixed on the dowel in advance of the dowel being fixable in the blind hole or in the passage opening of the first furniture part to fasten the first furniture part to a second furniture part,
    wherein the tool engagement faces comprise first and second longitudinal grooves offset from one another by 90°,
    wherein the grooves are open radially inwards,
    wherein the grooves are open axially in a direction of the connecting element,
    wherein the connecting device has a spherically-shaped end located in the dowel and the dowel comprises a ball cup that receives and holds the spherically-shaped end, and
    wherein the ball cup tapers in a direction of the connecting element.

* * * * *